United States Patent [19]

Chen

[11] Patent Number: 5,689,412

[45] Date of Patent: Nov. 18, 1997

[54] UNIVERALLY ADAPTABLE MULTI-FUNCTION PORTABLE POWER SUPPLY UNIT FOR AC/DC CONVERSION WHICH INCLUDING BACKUP BATTERY AND BATTERY CHARGER

[75] Inventor: James Chin-Ming Chen, Tao-Yuan, Taiwan

[73] Assignee: Delta Green Energy, Inc., Hsinchu, Taiwan

[21] Appl. No.: 422,993

[22] Filed: Apr. 14, 1995

[51] Int. Cl.[6] .................................................. H02J 7/00
[52] U.S. Cl. .......................................................... 363/125
[58] Field of Search ................................. 320/56, 13–14, 320/15, 39; 307/64–66; 363/125

[56] References Cited

U.S. PATENT DOCUMENTS

4,553,081  11/1985  Koenck ........................................ 320/43
5,237,258   8/1993  Crampton .................................... 320/14

Primary Examiner—Aditya Krishnan
Attorney, Agent, or Firm—Bo-In Lin

[57] ABSTRACT

This invention is a multi-function power supply, i.e., a power-mate unit, for providing DC input to a portable electronic device, e.g., a notebook computer, operable with a rechargeable battery. The power-mate unit includes an AC plug for electrically connecting to an AC power source for receiving the AC input current. The power-mate unit further includes an AC/DC power supply for converting the AC input current to an external DC operation current suitable for operating the portable electronic device. The power-mate unit further includes a backup battery pack connected to the AC/DC power supply for receiving a backup battery charging current for charging the backup battery pack wherein the backup battery pack further providing a backup DC current to the portable electronic device. The power-mate unit further includes a backup battery monitoring and display for continuously monitoring a charge capacity of the backup battery pack and for displaying the charge capacity. And, the power-mate unit further includes an electronic device plug-in jack for electrically connecting the power-mate unit to the electronic device for providing the external DC operation current and the backup DC current to the electronic device.

7 Claims, 9 Drawing Sheets

UNIVERALLY ADAPTABLE MULTI-FUNCTION PORTABLE POWER SUPPLY UNIT FOR AC/DC CONVERSION WHICH INCLUDING BACKUP BATTERY AND BATTERY CHARGER

BACKGROUND OF THE INVENTION

1. Field of the Invention

This invention relates generally to a direct current (DC) power supply for a portable electronic device such as a notebook computer. More particularly, this invention relates to an multi-function DC power supply system, i.e., a power-mate unit, including a backup battery pack and a charging circuit whereby the multi-function power supply system can be used as a backup battery to supplement a primary battery pack installed in the electronic device, and as a charger for both the backup and primary battery packs, and furthermore it can be used as a AC to DC converter to provide a DC voltage to the portable electronic device. Thus, by carrying a single power-mate unit, a user is provided with a multi-function unit which can be applied as a voltage converter, a battery charger and a backup battery pack.

2. Description of the Prior Art

Figure 1:
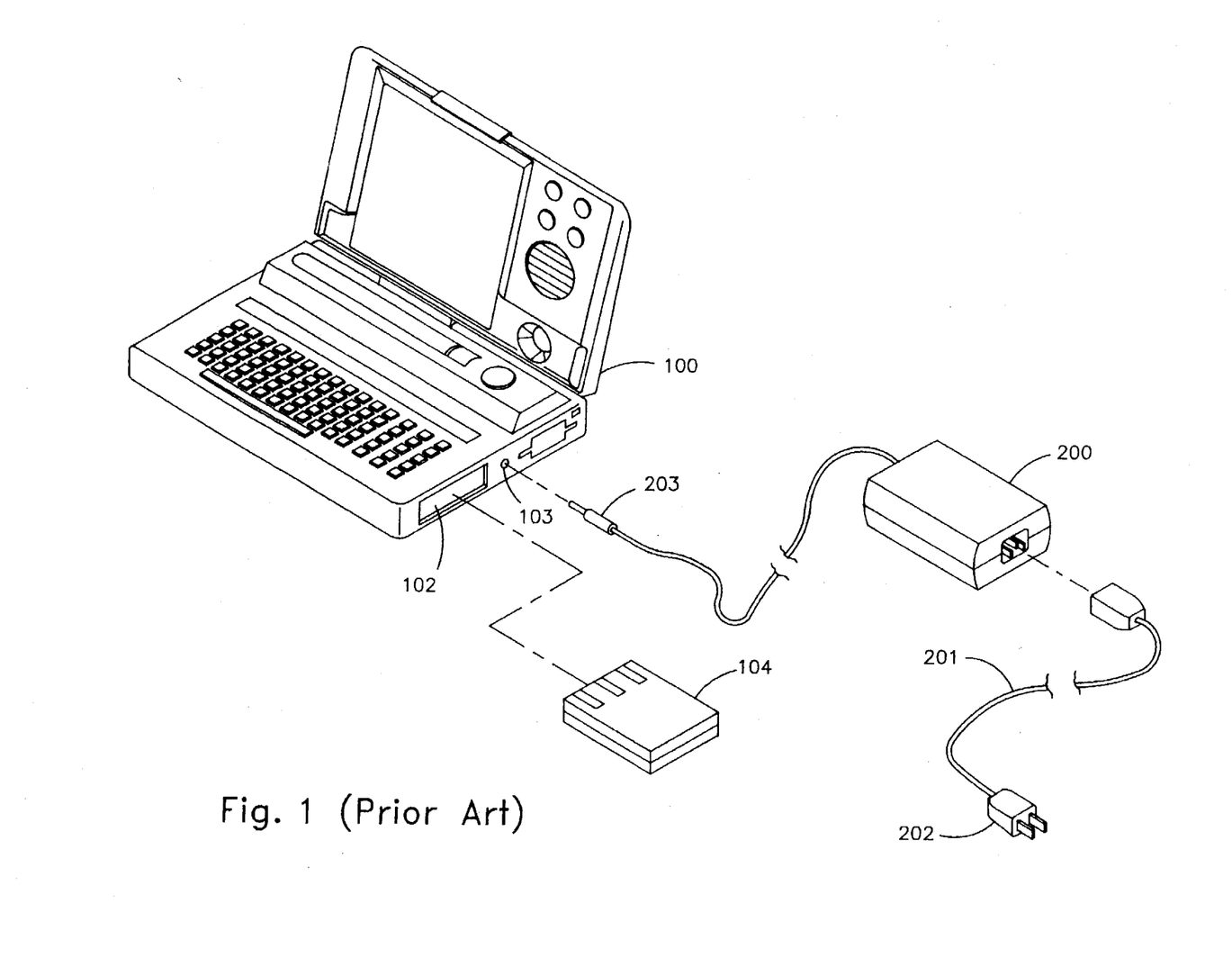
FIG. 1 is a perspective view of a prior art AC/DC power supply configuration employed by a portable notebook computer.

For a portable electronic device, e.g., a notebook computer or a personal digital assistant (PDA), it becomes a heavy burden for a user to carry an AC to DC adapter, i.e., an AC/DC converter, and also a separate backup battery in order to prepare for extended hours of operation without external AC power sources, .e.g., twelve hours flight across the pacific ocean. In additional to the weight and the bulky volume of these devices, conventional DC power supply systems have other operational difficulties. Referring now to FIG. 1 for a conventional power supply configuration of a notebook computer to illustrate these difficulties. A conventional notebook computer 100 is generally provided with two kinds of sources of DC current input. The notebook 100 has a battery compartment 102 to receive a battery pack 104 to be installed therein to provide battery DC power. The notebook 100 further has a DC input pin socket 103 to receive a DC power from an AC/DC adapter 200 via a DC power plug 203 for plugging into the socket 103 on the notebook computer 100. The AC/DC adapter 200 is then connected via an electric cord 201 and an electric plug to an AC power outlet socket (not shown) for providing external power to the notebook computer 100.

The conventional power supply configuration as shown above has several drawbacks. First, the DC current provided by the AC/DC adapter 200 is also used to charge the installed battery. However, when the electronic device, e.g., the notebook computer, is turned on, the DC current is mostly applied for operation of the device due to the high load requirement demanded by the notebook computer 100. Thus the mounted battery 104 is not charged during operation. The mounted battery 104 can only be charged when the electronic device, e.g., the notebook computer 100 is not in operation by an external power source connected via the AC/DC adapter 200, the electric cord 201 and the electric plug 202. Some notebook computers are provided with special control means to control a specially designed AC/DC adapter 200 to control the operation and charging of the installed battery 104. However, the charging of the installed battery would stilled be limited by the charging capacity of the AC/DC adapter 200 which generally is designed to apply most of the input power to the operation of the notebook computer. Thus, charging of the installed battery often has to be performed when the notebook computer is not in operation. Furthermore, when the mounted battery 104 is exhausted, in order to continue the operation of the notebook by the use of a backup battery, the notebook must first be turned off by first saving the files which are being processed by the notebook computer 100 and then turn the computer 100 back on again after the backup battery is installed into the battery compartment 102. The productivity is decreased due to interruption of user's works on the computer 100 caused by the time consuming processes of battery installation with the saving of the processed files on the computer and the turning off and on the computer 100.

In this conventional power supply configuration, a user's option for selecting a backup battery is limited. The limitation is due to the fact that the backup battery has to be specifically made for installation in the battery compartment 102 in order to be used as replacement of the mounted battery pack 104. A user is thus limited to use a backup battery pack made with specific brands by specific manufacturers. Furthermore, in order to charge this specifically made backup battery pack, a user may have to carry a separate charger, otherwise, the backup battery pack has to be charged by inserting it into the battery compartment 102 and by turning off the notebook computer 100 while an external charging power is provided via the AC/DC adapter 200.

With the above limitations and difficulties, there is still a need in the art of power supply for portable electronic devices to design a new power supply configuration in order to resolve these difficulties and limitations. Specifically, this new power supply configuration must be able to provide space savings and operation conveniences by employing a multi-function DC power supply unit which can generate DC power input to the portable device and further can be used as a universally adaptable backup battery pack and further as a battery charger for charging both the primary and the backup battery packs.

SUMMARY OF THE PRESENT INVENTION

It is therefore an object of the present invention to provide a new AC/DC power supply configuration for a portable electronic device by employing a multi-function power-mate unit which can achieve space saving, weight reduction and operational conveniences in order to overcome the afore-mentioned difficulties encountered in the prior art.

Specifically, it is an object of the present invention to provide a new AC/DC power supply configuration for a portable electronic device by employing a multi-function power-mate unit wherein the multi-function power-mate unit is integrated as a single portable unit to perform three functions serving as an AC/DC adapter, a backup battery pack and a battery charger to greatly enhance the portability and functional integration of the power supply requirements of the portable electronic device.

Another object of the present invention is to provide a new AC/DC power supply configuration for a portable electronic device by employing a multi-function power-mate unit wherein the operation of the electronic device is not interrupted when the first primary battery is exhausted because the power-mate unit include a backup battery which is employed to continuously supplement the primary battery.

Another object of the present invention is to provide a new AC/DC power supply configuration for a portable electronic device, e.g., a notebook computer, by employing a multi-function power-mate unit which can be universally adaptable to different brands of a type of portable electronic devices thus an user is provided with a standard power-mate unit for each type of electronic devices without requiring to carefully select a particular brand or model to assure compatibility.

Another object of the present invention is to provide a new AC/DC power supply configuration for a portable electronic device by employing a multi-function power-mate unit wherein the primary and backup battery can be continuously charged either simultaneously or alternately by a single external power source without interruption whereby the productivity for an user may be increased.

Briefly, in a preferred embodiment, the present invention comprises a multi-function power supply apparatus for providing DC input to a portable electronic device operable with a rechargeable battery. The power supply apparatus comprising an AC connecting means for electrically connecting to an AC power source for receiving the AC input current therefrom. The power supply apparatus further includes an AC/DC power supply for converting the AC input current to an external DC operation current suitable for operating the portable electronic device. The power supply apparatus further includes a backup battery pack connected to the AC/DC power supply for receiving a backup battery charging current for charging the backup battery pack wherein the backup battery pack further providing a backup DC current to the portable electronic device. The power supply apparatus further includes a backup battery monitoring and display means for continuously monitoring a charge capacity of the backup battery pack and for displaying the charge capacity. And, the power supply apparatus further includes an electronic device connecting means for electrically connecting the power supply apparatus to the electronic device for providing the external DC operation current and the backup DC current to the electronic device.

It is an advantage of the present invention that it provides a new AC/DC power supply configuration for a portable electronic device by employing a multi-function power-mate unit which can achieve space saving, weight reduction and operational conveniences in order to overcome the aforementioned difficulties encountered in the prior art.

Another advantage of the present invention is that it provides a new AC/DC power supply configuration for a portable electronic device by employing a multi-function power-mate unit wherein the multi-function power-mate unit is integrated as a single portable unit to perform three functions serving as an AC/DC adapter, a backup battery pack and a battery charger to greatly enhance the portability and functional integration of the power supply requirements of the portable electronic device.

Another advantage of the present invention is that it provides a new AC/DC power supply configuration for a portable electronic device by employing a multi-function power-mate unit wherein the operation of the electronic device is interrupted when the first primary battery is exhausted because the power-mate unit include a backup battery which is employed to continuously supplement the primary battery.

Another advantage of the present invention is that it provides a new AC/DC power supply configuration for a portable electronic device, e.g., a notebook computer, by employing a multi-function power-mate unit which can be universally adaptable to different brands of a type of portable electronic devices thus an user is provided with a standard power-mate unit for each type of electronic devices without requiring to carefully select a particular brand or model to assure compatibility.

Another advantage of the present invention is that it provides a new AC/DC power supply configuration for a portable electronic device by employing a multi-function power-mate unit wherein the primary and backup battery can be continuously charged either simultaneously or alternately by a single external power source without interruption whereby the productivity for an user may be increased.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 2:
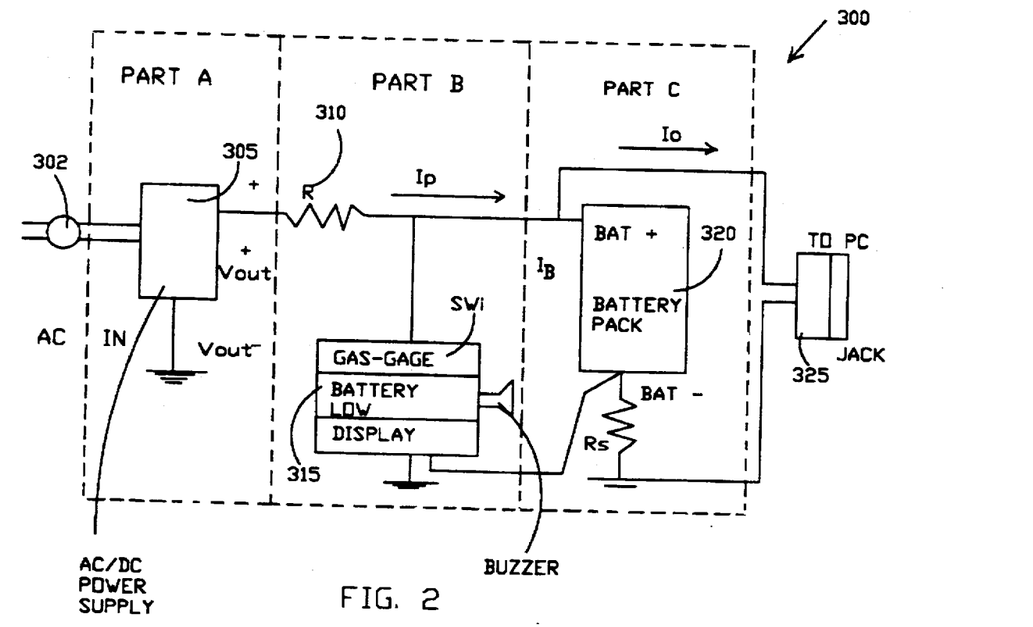
FIG. 2 is a functional block diagram for a multi-function power-mate unit of the present invention.

FIG. 2 is a functional block diagram for a multi-function power-mate unit 300 of the present invention. The power-mate unit 300 includes an AC/DC power supply 305 which receives, from an electric plug 302 plugging into an external AC outlet (not shown), an AC power input (AC IN) ranging from 90 to 264 volts. The AC/DC power supply 305 converts the AC input to a DC output current, i.e., $I_p$, which flows through an output resistor 310 for providing power to (i) a battery monitor and display means 315 (ii) a backup battery pack 320 via a battery current $I_B$, and (iii) a portable electronic device, e.g., a notebook computer (not shown), by an output current $I_o$ via a plugging pin 325. When the power-mate unit 300 is plugged into an external AC outlet and not connected to an electronic device, $I_o=0$, the AC power is employed to charge the backup battery pack 320. The charging current $I_B$ can be represented as:

$$I_B = (V_{OUT} - V_B)/R \qquad (1)$$

Where $V_{OUT}$ is the output voltage from the AC/DC power supply 305 and $V_B$ is the voltage of the battery. As the backup battery pack 320 is gradually charged, the voltage $V_B$ is increased and the charging current $I_B$ is gradually decreased. At the point when the battery 320 is fully charged, $V_B$ is approximately set to be equivalent to $V_{OUT}$ and the charging current flowing to the battery is decreased to zero and overcharging of the battery 320 is prevented. The battery monitoring and display means 315 continuously monitor the current flowing through a resistor Rs. The charging current is measured as $$I_B = V_{rs}/R_s \quad (2)$$

and the amount of charging is then measured as an integration of the charging current over the time of charging operation. The amount of charges is then displayed to an user by the battery monitoring and display means 315.

As the power-mate unit 300 is plugged into an external AC power source via the AC plug 302 and to a portable electronic device via the plugging pin 325, the output current $I_p$ is now being drawn by two branches. An output branch connected to the external device draws an output current Io to provide power input to operate the external electronic device. A second branch draws a current $I_B$ to charge the battery. The demand of an output current to operate the external electronic device may vary. The instant current required by the device may exceed the output current generated by the AC/DC power supply 305, i.e., $I_o > I_p$. In order to satisfy the operational requirement of the external device, the backup battery pack 320 is used to supplement the insufficient current requirement from the AC/DC power supply 305 along, i.e., $I_o = I_p + I_B$. On the other hand, when the demand of the external device is small, i.e., $I_o < I_p$, the extra current after drawn by the output branch, i.e., $I_p - I_o$, is left to charge the battery pack 320, i.e., $I_B = I_p - I_o$. Meanwhile, the battery monitoring and display means 315 continuously monitor the directions and amounts of current flowing through the resistor Rs as a function of time to determine the state of the backup battery pack 320 and display to an user the capacity of battery 320 at different points in time. Aided by the power provided by the backup battery pack 320, the AC/DC power supply 305 can be designed to meet the averaged load requirements. While the instant load requirement of an electronic device may exceed that of the averaged load, the insufficient power can be supplemented by the backup battery pack 320. Cost savings can be achieved by the power-mate unit 300 of this invention as compared with the conventional power supply system which always has be designed to provide extra power output margins in order to satisfy the instant peak load requirements.

As the power-mate unit is connected to the electronic device, e.g., a notebook computer, via the plugging pin 325, and not plugged into an AC outlet, there is no power supply current $I_p$ generated by the AC/DC power supply 305, i.e., $I_p = 0$. The external electronic device is drawing its power from a primary battery typically installed in its battery pack compartment. If the primary battery installed on the portable device is sufficient for such operation, then $I_B = I_o = 0$, i.e., no power is required to be supplement by the power-mate unit 300. On the other hand, if the primary battery is low and is insufficient to sustain the operation of the electronic device such as a notebook computer, then supplemental power can be provided from the power-mate unit 300. Then $I_B = I_o \neq 0$ and the current is applied as input power to sustain the operation of the portable electronic device. Under that circumstances, the multi-function power-mate unit 300 is employed as a backup battery. Unlike the situation with a conventional power supply unit, the portable device, e.g., a notebook computer, does not have to first save the files and then turning off the notebook computer in order to remove the primary battery for replacement of the backup battery. Time consuming processes of saving files, shutting down the device, and then inserting the backup battery pack into the battery compartment before turning on the computer to re-initiate and then continue the operation are therefore eliminated. The productivity of computer users are improved because of the simplification and streamlining of the procedures in switching to a backup battery pack are achieved by the use of the power-mate unit 300 for the notebook computers.

Figure 3:
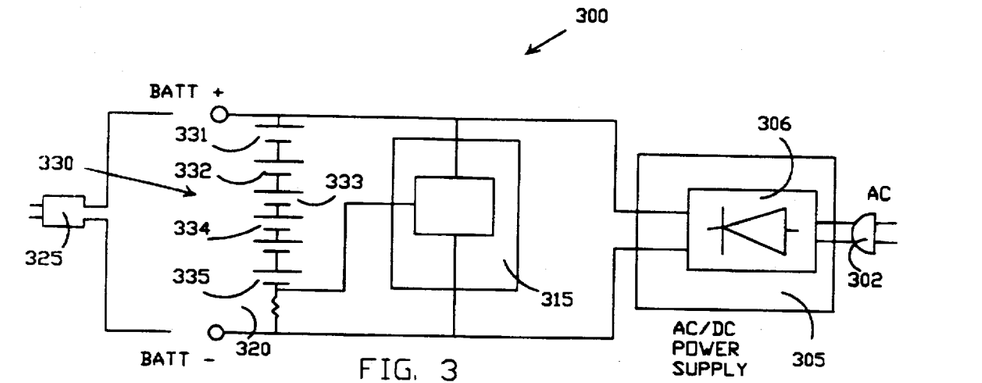
FIG. 3 is a circuit schematic diagram showing a simplified circuit diagram of the power-mate unit of the present invention.
Figure 3A:
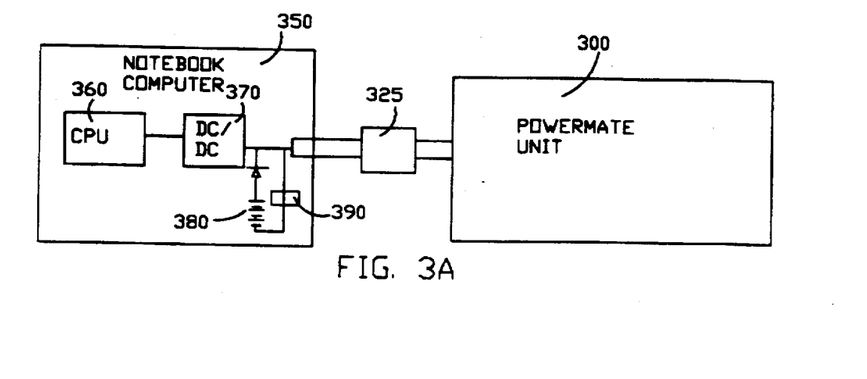
Figure 3B:
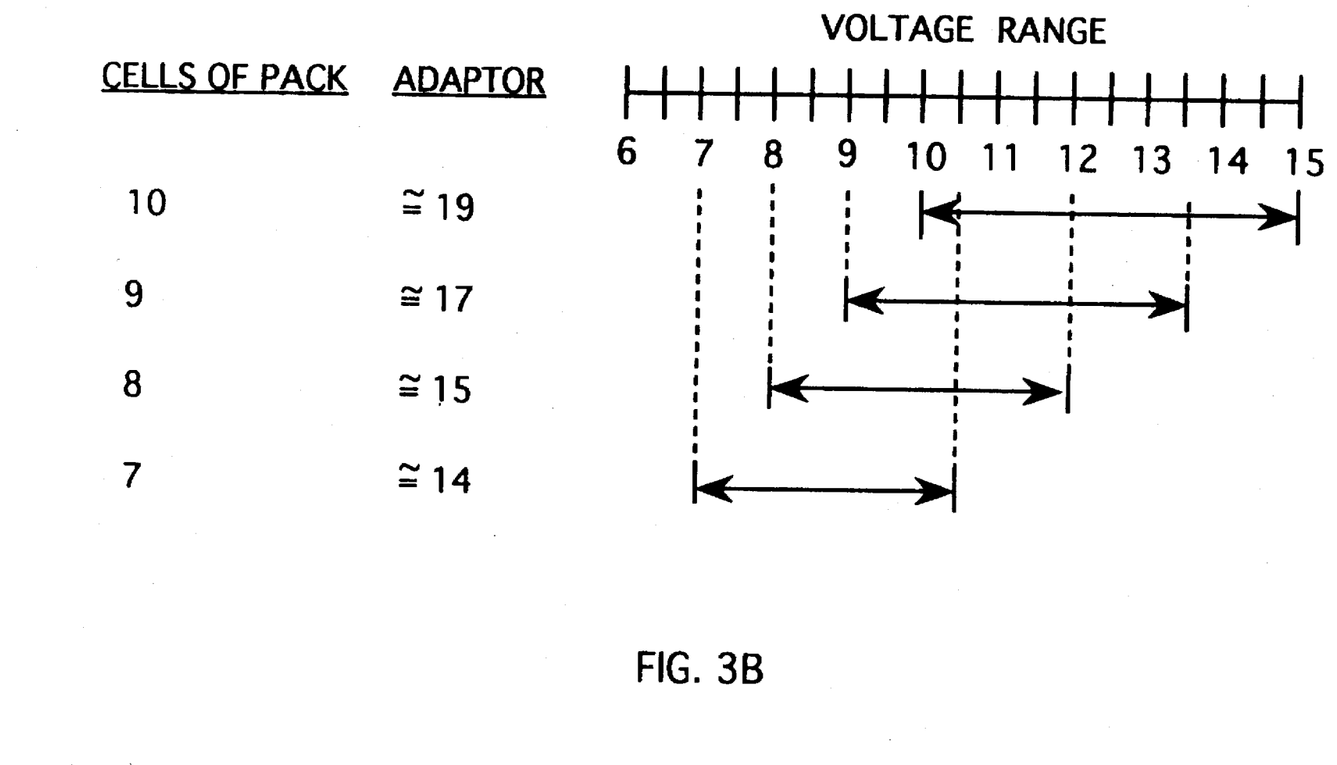
Figure 4:
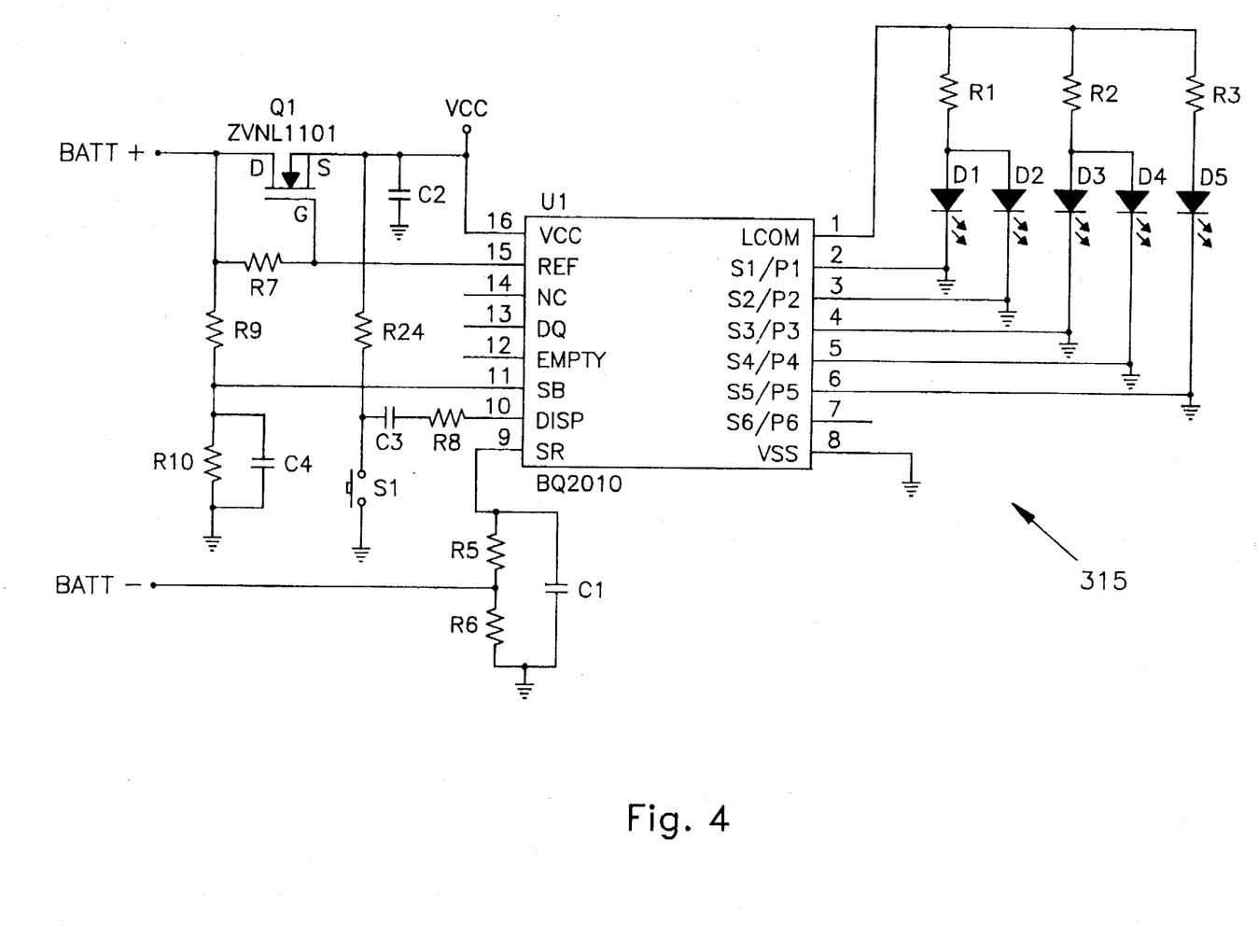
FIG. 4 shows the circuits of the monitoring and display means for continuously monitoring and displaying the capacity of the backup battery pack.

FIG. 3 is a circuit schematic diagram showing a simplified circuit diagram of the power-mate unit 300. The AC/DC power supply 305 includes a rectifier 106 to convert the AC input into a DC output. The AC/DC power supply 305 can be a standard switching power supply. A typical circuit diagram is similar to a power supply used for a commercially available switching power supply with Model number SMP-18BP. Since the circuit components and their functions are well known in the art, further description of this power supply is not necessary. FIG. 4 shows the details of the monitoring and display means 315 for continuously monitoring and displaying the capacity of the backup battery pack 320. A capacity-gauge integrated circuit (IC), or frequently referred to as gas-gauge type of IC, preferably a BQ2010 IC, i.e., an IC which is designated as U1 in the diagram, produced by Benchmarq Company, is used for monitoring and displaying the capacity of the battery pack 320. A transistor Q1, e.g., ZVNL1101, and a resistor R7 and a capacitor C2 form an unregulated power source circuit in converting the voltage from the backup battery 320 to a voltage Vcc as required by the BQ2010 IC, i.e., the U1 IC. A parallel connected resistor-capacitor (RC) loop is formed by the use of resistors R5, R6 and C1 to detect the variations of current and voltages over these components. The detected currents and voltages from this RC circuit are coupled to the BQ2010 IC which determines whether the battery is be charged or discharging from the sign of the voltage of R6. When $V_{R6}$ is positive, the battery 320 is being charged, conversely the battery 320 is discharging. Another set of parallel connected resistors R9 and R10 wherein R10 is connected to PIN11 for measuring the voltage across R10, i.e., $V_{R10}$ for determining a voltage of the battery 320 when the discharge must be stopped. The capacity gauge IC BQ2010 has a clock and an accumulator to integrate over time the total amounts of charges stored or released from the battery 320 to determine the battery capacity as function of time. The battery capacity as determined by the BQ2010 IC is compared with a total capacity of the battery 320. The result of the comparison is then applied to a set of light emitting diodes (LEDs), i.e., D1 to D5 wherein the emitting of light from each LED representing 20% of the battery capacity. The light emitted from the LEDs then forms a display means for indicating to a user the battery capacity as function of time based the number of LEDs emitting light.

Figure 5:
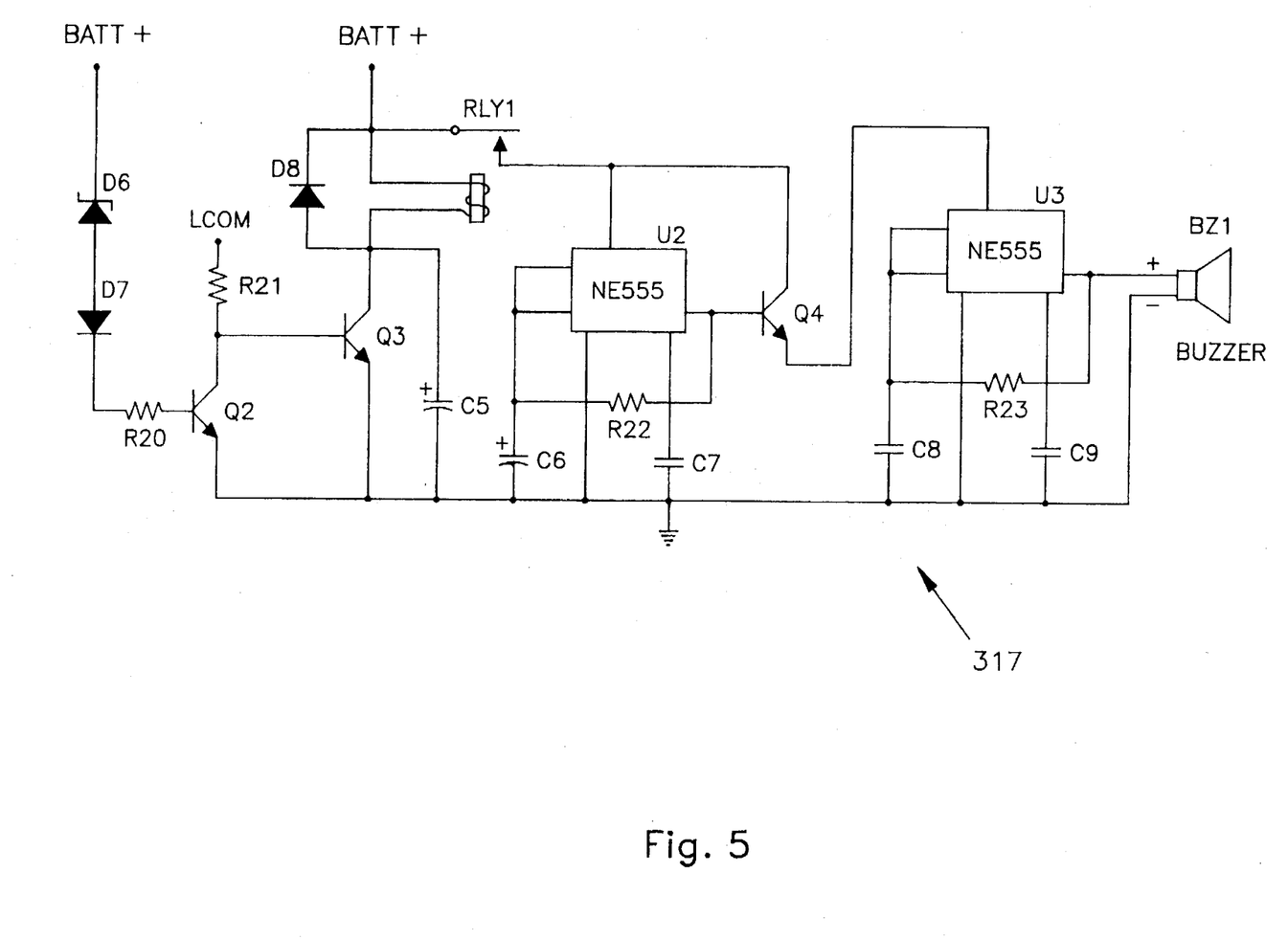
FIG. 5 shows a circuit diagram for a battery low warning signal generator as part of the monitor and display means of FIG. 4.

FIG. 5 shows a circuit diagram for a battery low warning signal generator 317 as part of the monitor and display means 315. The warning signal generator 317 includes a detection control circuit formed by a Zenor diode D6, diode D7, resistor R20, transistors Q2 and Q3 and a relay RY1. The warning signal generator 317 further include a square wave generator U2 and a sound wave generator U3. As the electric charge of the battery pack 320 is about to be exhausted, the voltage measured by the PIN11 of U1 for the voltage across R10 is inputted to the detection control circuit which activates U2 thus causing a flash warning signal generated by the light emitting diode (LED) D1. In the meantime, the sound wave generator U3 is also activated sending a signal to the buzzer BZ1 to generate a buzz sound warning an user of a low condition of the battery pack 320. In a preferred embodiment, when the voltage $V_{R10}$ indicated that the capacity of the battery pack 320 is discharged to 5 to 10% level of the full charge, the LED D1 is flashed with a flashing light of 2–5 Hz. In the meantime, U2, i.e., a NEEE IC, generates a square wave ranging from 2 to 5 Hz and the U3, i.e., a second NEEE IC generated a buzz sound by sending a signal to the BUZ1.

Figure 6A:
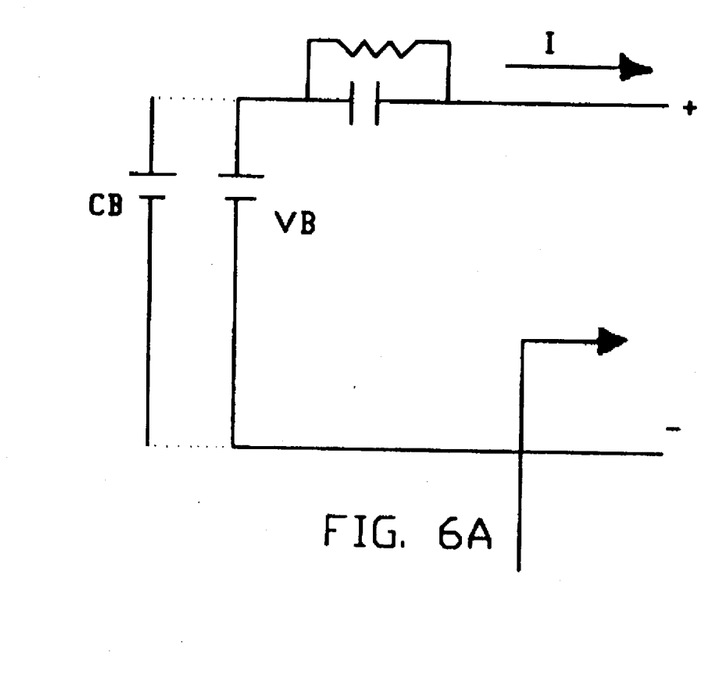
FIGS. 6A and 6B show the equivalent circuits of the battery pack during discharge and charge respectively.
Figure 6B:
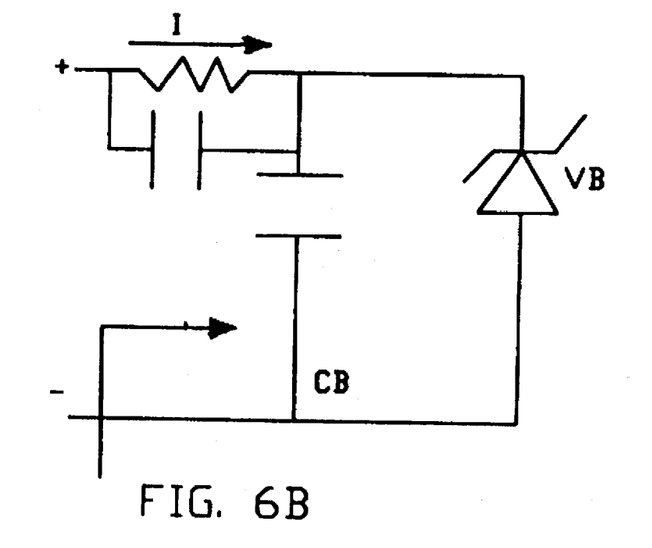
Figure 7A:
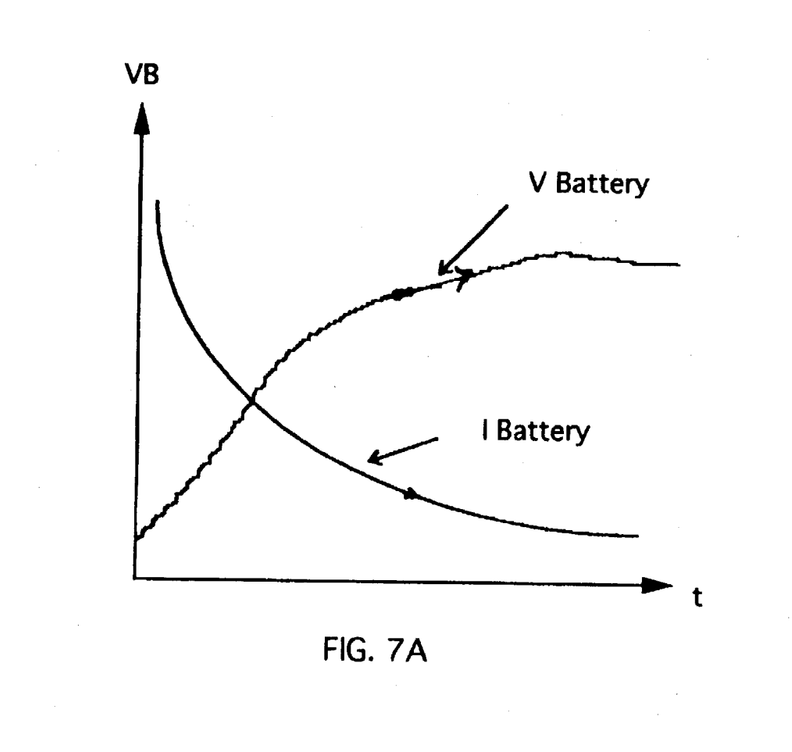
FIGS. 7A to 7C shows the variations of the battery voltage $V_B$ and battery current $I_B$ when the battery pack is connected to the AC power source only (FIG. 7A), to the notebook computer only (FIG. 7B) and to both the AC power source and the notebook computer (FIG. 7C).
Figure 7B:
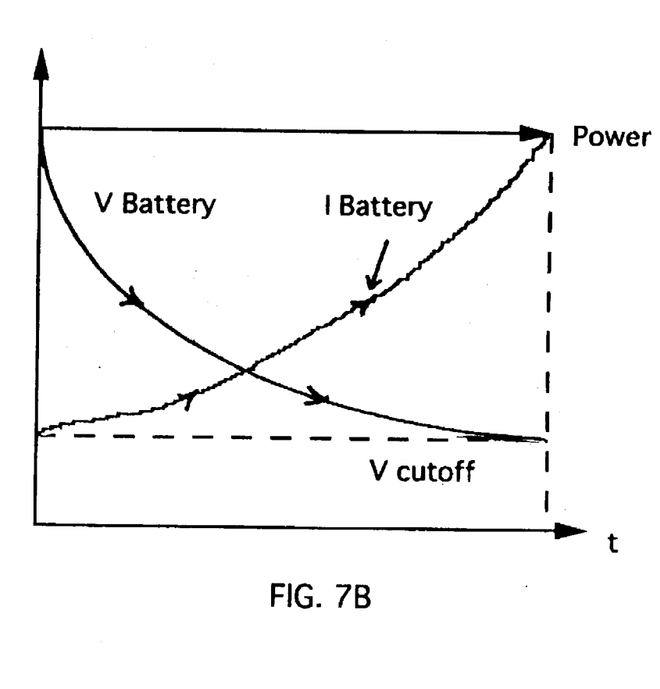
Figure 7C:
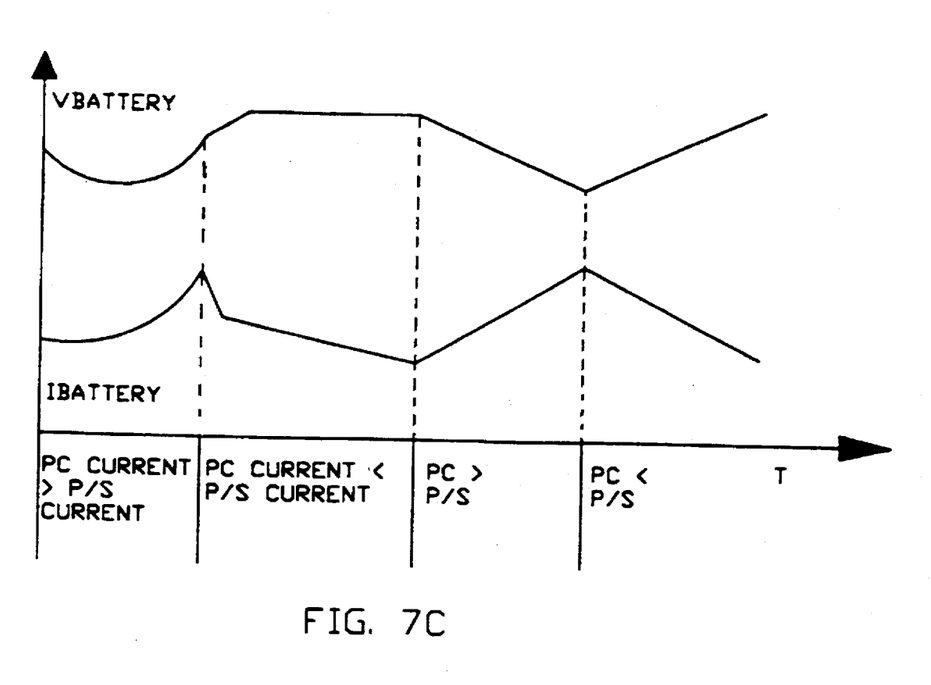

FIGS. 6A and 6B show the equivalent circuits of the battery pack 320 during discharge and charge respectively. In the time of discharge, the battery pack 320 is working as a capacitor Cb providing an input current I to an electric device, e.g., a notebook computer. In the time of charge by an external power source, the battery pack 320 serves as a large capacitor and stabilizer. Thus, the power-mate unit 300 includes its battery pack 320 can be used as a filter and stabilizer for working tougher with the AC/DC power supply 305 to provide power to a notebook computer. A saving of space and weight is achieved with the battery pack 320 included in the power mate unit 300 because additional circuits for stabilizer and filter are not required. FIGS. 7A to 7C shows the variations of the battery voltage VB and battery current IB when the battery pack 320 is connected to the AC power source only (FIG. 7A), to the notebook computer only (FIG. 7B) and to both the AC power source and the notebook computer (FIG. 7C). The voltage and current variations as shown in these figures are all within the normal working ranges of the nickel metal hydride (Ni-MH) rechargeable battery.

In summary, the present invention thus discloses a multi-function power supply apparatus, i.e., the power-mate unit 300, for providing DC input to a portable electronic device operable with a rechargeable battery. The power supply apparatus 300 includes an AC/DC power supply 305 for converting an AC input current to an external DC operation current suitable for operating the portable electronic device. The power supply apparatus 300 further includes a backup battery pack 320 connected to the AC/DC power supply 305 for receiving a backup battery charging current for charging the backup battery pack 320 wherein the backup battery pack 320 further providing a backup DC current to the portable electronic device. In a preferred embodiment, the multi-function power supply apparatus 300 further includes a backup battery monitoring and display means 315 for continuously monitoring a charge capacity of the backup battery pack 320 and for displaying the charge capacity. In another preferred embodiment, the multi-function power supply apparatus 300 further comprises an AC connecting means 302 for electrically connecting to an AC power source for receiving the AC input current therefrom. In yet another preferred embodiment, the multi-function power supply apparatus 300 further includes an electronic device connecting means 325 for electrically connecting the power supply apparatus 300 to the electronic device for providing the external DC operation current and the backup DC current to the electronic device.

The present invention discloses a new and non-obvious AC/DC power supply configuration for a portable electronic device by employing a multi-function power-mate unit which can achieve space saving, weight reduction and operational conveniences whereby the imitations and difficulties encountered in the prior art are resolved. Specifically, the multi-function power-mate unit is integrated as a single portable unit to perform three functions serving as an AC/DC adapter, a backup battery pack and a battery charger to greatly enhance the portability and functional integration of the power supply requirements of the portable electronic device. Furthermore, by employing the multi-function power-mate unit, the operation of the electronic device is not interrupted when the first primary battery is exhausted because the power-mate unit include a backup battery which is employed to continuously supplement the primary battery. The multi-function power-mate unit can be universally adaptable to different brands of a type of portable electronic devices thus an user is provided with a standard power-mate unit for each type of electronic devices without requiring to carefully select a particular brand or model to assure compatibility. Additionally, by employing the multi-function power-mate unit of the present invention, the primary and backup battery can be continuously charged either simultaneously or alternately by a single external power source without interruption whereby the productivity for an user may be increased.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A portable multi-function power supply apparatus for providing DC input to a portable electronic device operable with a rechargeable battery, said power supply apparatus comprising:

an AC/DC power supply for converting an AC input current to an external DC operation current suitable for operating said portable electronic device;

a backup battery pack connected to said AC/DC power supply for receiving a backup battery charging current for charging said backup battery pack wherein said backup battery pack further providing a backup DC current to said portable electronic device;

said backup battery pack being connected in parallel to said AC/DC power supply thus serving as an equivalent capacitor for regulating and stabilizing said external DC operation current output from said AC/DC power supply whereby said AC/DC power supply being provided to operate without requiring a separate current regulator for providing said DC operation current suitable for operating said portable electronic device; and said AC/DC power supply and said backup battery being integrated as a separate unit-body portable power supply apparatus independent from and suitable for portable operation with said portable electronic device.

2. The multi-function power supply apparatus of claim 1 further comprising:

a backup battery monitoring and display means which being integrated into said unity-body portable power supply apparatus for continuously monitoring a charge capacity of said backup battery pack and for displaying said charge capacity.

3. The multi-function power supply apparatus of claim 1 further comprising:

an AC connecting means for electrically connecting said unity-body portable power supply apparatus to an AC power source for receiving said AC input current therefrom.

4. The multi-function power supply apparatus of claim 1 further comprising:

an electronic device connecting means for electrically connecting said unit-body portable power supply apparatus to said electronic device for providing said external DC operation current and said backup DC current to said electronic device.

5. A portable multi-function power supply apparatus for providing DC input to a portable electronic device operable with a rechargeable battery, said power supply apparatus comprising:

an AC connecting means for electrically connecting said power supply apparatus to an AC power source for receiving said AC input current therefrom;

an AC/DC power supply for converting said AC input current to an external DC operation current suitable for operating said portable electronic device;

a backup battery pack connected to said AC/DC power supply for receiving a backup battery charging current for charging said backup battery pack wherein said backup battery pack further providing a backup DC current to said portable electronic device;

said backup battery pack being connected in parallel to said AC/DC power supply thus serving as an equivalent capacitor for regulating and stabilizing said external DC operation current output from said AC/DC power supply whereby said AC/DC power supply being provided to operate without requiring a separate current regulator for providing said DC operation current suitable for operating said portable electronic device;

a backup battery monitoring and display means for continuously monitoring a charge capacity of said backup battery pack and for displaying said charge capacity;

said AC/DC power supply, said backup battery, and said backup battery monitoring and display means being integrated as a separate unit-body portable power supply apparatus independent from and suitable for portable operation with said portable electronic device; and an electronic device connecting means for electrically connecting said portable power supply apparatus to said electronic device for providing said external DC operation current and said backup DC current to said electronic device.

6. A portable multi-function power supply apparatus for providing DC input to a portable notebook computer operable with a rechargeable battery, said power supply apparatus comprising:

an AC/DC power supply for converting an AC input current to an external DC operation current suitable for operating said portable notebook computer;

a backup battery pack connected to said AC/DC power supply for receiving a backup battery charging current for charging said backup battery pack wherein said backup battery pack further providing a backup DC current to said portable notebook computer;

said backup battery pack being connected in parallel to said AC/DC power supply thus serving as an equivalent capacitor for regulating and stabilizing said external DC operation current output from said AC/DC power supply whereby said AC/DC power supply being provided to operate without requiring a separate current regulator for providing said DC operation current suitable for operating said portable notebook computer;

a connecting cord for providing said DC operation current and said backup DC current to said notebook computer wherein said connecting cord including a universally adaptable plug for plugging into a standard pin hole of said notebook computer; and said AC/DC power supply and said backup battery being integrated as a separate unit-body power supply apparatus independent from and suitable for portable operation with said portable notebook computer.

7. The portable multi-function power supply apparatus of claim 6 wherein:

said portable multi-function power supply apparatus being provided to be compatible with several types of rechargeable batteries for operating with several types of notebook computers whereby said portable multi-function power supply apparatus can be applied as an universally adaptable AC/DC-converter/battery charger/backup battery unit for said several types of notebook computers.

* * * * *